Nov. 26, 1963
F. S. SCHADE
3,111,774
MASKING DEVICE FOR "PROGRAM TEACHING" USE
IN RING BINDER ASSEMBLIES
Filed July 7, 1961
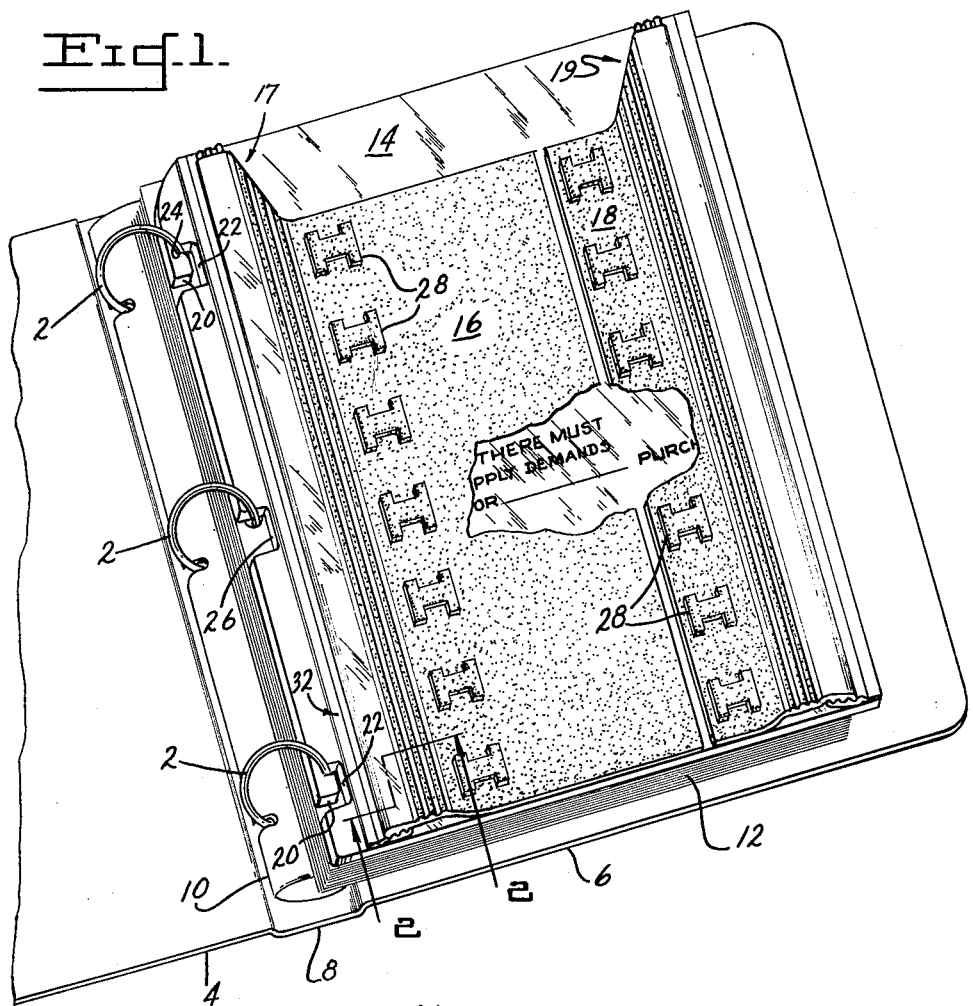
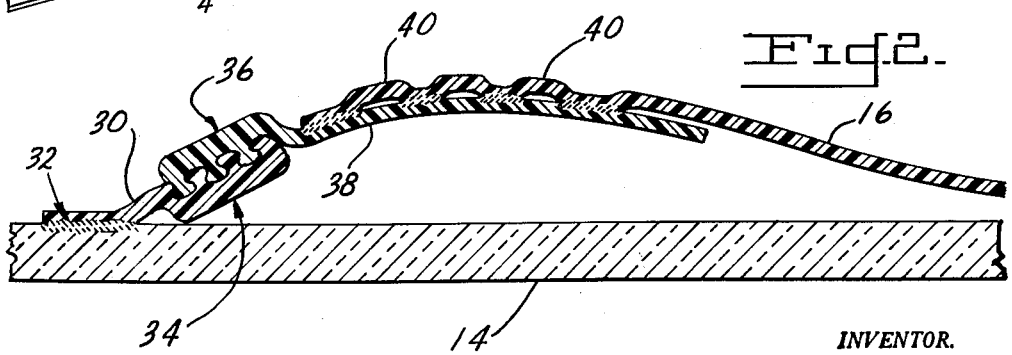
INVENTOR.
FRANK STANLEY SCHADE
BY Chapin + Neal
attorneys

United States Patent Office

3,111,774
Patented Nov. 26, 1963

3,111,774
MASKING DEVICE FOR "PROGRAM TEACHING" USE IN RING BINDER ASSEMBLIES
Frank Stanley Schade, Holyoke, Mass., assignor to National Blank Book Company, Holyoke, Mass., a corporation of Massachusetts
Filed July 7, 1961, Ser. No. 122,544
5 Claims. (Cl. 35—9)

This invention relates to a masking device for use with so-called "program teaching" or "program learning" sets of questions and answers and in particular to masking devices adapted for use with conventional loose leaf ring binder assemblies such as the common three-ring binder.

As is well known in the field of educational instruction so-called "program teaching" methods use a question and answer form of instruction, each question and its answer representing a small sequential step in a series of questions and answers whereby a student may progress rapidly and readily absorb a subject under study. In using the method each individual question is taken up in the order of the prepared or "programmed" sequence and the answer written down by the student. As each answer is made it is checked against the correct answer printed beside the question before proceeding to a succeeding question of the series. In this way the student can immediately determine the accuracy of his own answer. This prepares him for the next step or question which follows. The student's attention is thus focused on the content of each individual step and his sense of achievement reinforced by immediately knowing that his answer is correct. If the answer is not correct the student's thoughts are reoriented and a measure of direction immediately given for succeeding steps.

Many elaborate mechanisms and devices have been developed for "program teaching" methods. It is a primary object of this invention to provide a simplified, inexpensive, device for taking advantage of the method, either for self-instruction or for classroom use, and contemplating the use of conventional inexpensive binder constructions of the toggle ring type.

Another object of the invention is to provide a masking device which will be convenient for school or classroom use and which will enable the use of printed sets of "programmed" subjects in ring binders. In my co-pending application Serial No. 123,949, filed July 7, 1961, a masking device integral with a cover panel structure was disclosed. In the present application a masking device is disclosed which may be removably incorporated with ring binder mechanisms. This invention is characterized by a stiff transparent panel to be removably mounted on the binder rings to overlie a page containing questions and answers presented in columnar fashion, the stiff panel carrying simplified flexible masking flaps for successively uncovering the series of questions and answers.

The above and other specific advantages of the invention will be apparent from the following description of an embodiment of the invention as shown in the drawings in which:

FIG. 1 is a pictorial view of the masking device in position on the rings of a three ring binder assembly; and
FIG. 2 is a fragmentary sectional view on an enlarged scale showing details of the masking flap connection.

As shown in the drawing the masking device is mounted on the rings 2 of a conventional three-ring binder assembly with hinged covers 4 and 6 and back panel 8 on which is mounted a conventional toggle plate mechanism 10. On the rings 2 is mounted a pack of loose leaf filler pages 12 which may contain a printed "programmed" set of questions and answers.

The device includes a stiff panel 14 of transparent plastic material adapted for releasable mounting on the rings 2. The underlying top page 12 of the pack may be viewed through panel 14 as the masking flaps 16 and 18 are manipulated to unmask appropriate sections of the underlying page.

At the inner marginal edge of the panel 14 are cut three spaced notched portions, to coincide with the spaced location of the rings. The top and bottom notches are in the form of reversely directed slots having an entrance at 20, a right angled portion 22 and a reversely directed blind end at 24. Thus the panel is securely held on the rings against inadvertent shifting. The center notch 26 is open and it will be seen that the panel can be mounted by inserting the top and bottom rings through the entrance slots shifting the panel downwardly and outwardly to releasably lock it in position. Thus a predetermined overlying position is established with respect to the underlying sheet of the pack of pages.

The masking flaps 16 and 18 are each of thin limp thermoplastic material, the flap 16 being arranged to cover a columnar area beneath which the series of questions are arranged and the flap 18 arranged to mask the columnar area bearing the answers in side by side relationship to the questions. The flaps are preferably attached for slidable movement at opposite sides of the panel 14, flap 18 adjacent the extreme edge and flap 16 along the margin inwardly adjacent the slotted portions. Vertically spaced upraised H portions as at 28 are provided on the upper surface of the flaps for convenient finger manipulation in sliding the flaps.

In use it will be seen that flap 16 will first be moved downwardly enough to unmask a first question adjacent the top of the page. The student will then record his answer as by writing it on a separate sheet or otherwise noting his answer. Then flap 18 is moved downwardly a sufficient distance to unmask the correct printed answer on the underlying page 12. The written and correct answers are compared and the student is then ready to proceed with the next question by again sliding flap 16 downwardly. Thus the questions and answers are successively viewed until the page is completed.

It will be noted that the top edge of each flap is downwardly offset from the top edge of the panel while the connecting marginal portion of the flaps are angled upwardly as at 17 and 19 substantially to the top panel edge. This means that when the flaps are moved to the bottom of the panel the material at the bottom of the underlying page may be viewed without sliding the flaps off from the hinged slide connection at the edges. Thus the flaps can easily be returned to the full masking position shown by FIG. 1 without becoming disengaged at the bottom from the connecting track.

When the flaps are returned to the masking position after completing a page, the panel is then removed from the rings and slid under the completed page and on top of the next page. The user by "feel" can re-mount the panel on the rings or may then turn the completed page 12 on the rings to lie against cover 4 and subsequently re-engage the rings and slots. In either event the succeeding page will be masked against inadvertent exposure.

The connecting slide strips for holding the flaps with relation to the panel 14 are best shown by FIG. 2. The panel and flaps are preferably heat sealable and as seen in FIG. 2 a strip 30 of heat sealable extruded plastic material is welded along the upper surface of panel 14 at 32.

Along the free edge of strip 30 longitudinally directed dovetail tongue and groove portions at 34 are formed to mate with similarly formed portions at 36 of a connecting strip 38 heat-sealed along the undersurface of the inner flap margin. The tongue and groove portions grip the flap against separation from the panel-attached strip 30 and permit an easy vertical sliding movement of the flap on the panel surface.

It will be noted in FIG. 2 that the preferred attachment of the strip 38 is at the underside of the flap margin where a series of ribs 40 have been upraised from the surface of the flap. When sealing the strip 38 to the spaced rib portions at the undersurface of the ribbed area, this area is slightly arched and the sealed strip 38 in effect "gathers" the material to hold a downwardly directed reinforced area which tends to normally urge the flap against the panel surface. In this way a slight "spring" tension is had to maintain the flat face to face contact of the flap body portion on the panel surface.

What is claimed is:

1. A masking device for "program teaching" use combinable with loose leaf ring binder assemblies, said device comprising a stiff panel of transparent material through which written matter on an underlying binder assembly page can be viewed, slotted portions at the inner edge of said stiff panel for removable engagement on binder rings and establishing a predetermined positional relationship of said panel with respect to said underlying pages, a limp flexible masking flap and interconnecting means for maintaining the flap in a predetermined position in overlying relation on the panel, said interconnecting means having overlapping portions extending from the panel and flap edges respectively along substantially the full length of a marginal edge portion of the panel, the interface between said portions having longitudinally extending gripping surfaces for slidable movement of the flap parallel to the inner and outer side edges of said panel.

2. A masking device for "program teaching" use combinable with loose leaf ring binder assemblies, said device comprising a stiff panel of transparent material through which written matter on an underlying binder assembly page can be viewed, apertured portions at the inner edge of said stiff panel for removable engagement on binder rings and establishing a predetermined positional relationship of said panel with respect to said underlying pages, a limp flexible masking flap and interconnecting means along substantially the full length of a marginal edge portion of the panel for maintaining the flap in a predetermined position in overlying relation on the panel, said interconnecting means comprising a fastening strip having one edge fixed vertically of said panel and its other edge providing a vertical hinging portion faced with longitudinally disposed dovetail tongue and groove portions, and a strip affixed to the edge of said flap and having its free edge faced with similarly shaped tongue and groove portions overlapping and interfitting with said first tongue and groove portions of said fastening strip, the interface between said overlapping edge portions being slidably related for movement of said flap on said panel surface.

3. The structure of claim 2 in which said fastening strip for said flap is arranged along the inner marginal edge portion of said transparent panel and a second flap of limp flexible material is fixed at the outer edge of said panel, similar slidable interconnecting means joining said latter flap to the panel, the free edges of said flaps terminating in adjacent faced relation and together substantially covering the surface of the panel.

4. The structure of claim 2 in which the stiff panel, the limp masking flap, and the interconnecting strips are all of heat sealable thermoplastic material, said panel fastening strip is heat sealed to the top panel surface, and said flap-fastening strip is heat-sealed to the marginal undersurface of the flap, said marginal flap portion being upwardly ribbed and arched in the area of said strip sealing whereby said flap is normally urged to lie in flat contact against said panel surface.

5. A masking device for program teaching use combinable with loose leaf sheet ring binder assemblies, said device comprising a stiff transparent panel through which written material on an underlying sheet of the assembly can be viewed, said panel at one edge having apertured portions to removably engage the binder rings for a predetermined positional relation of the panel relative to underlying sheets of the binder, a limp flexible masking flap and interconnecting means maintaining the flap in slidable overlying relation to the panel along an edge thereof for masking in part at least written material of the sheets, said interconnecting means having overlapping interfitting portions secured to the flap edge and to a marginal edge section of said panel, the marginal interfitting portions extending substantially the full length of the panel edge for sliding said flap from a full overlying masking position to a position substantially withdrawn therefrom.

References Cited in the file of this patent

UNITED STATES PATENTS

| | | |
|---|---|---|
| 2,310,725 | Widder et al. | Feb. 9, 1943 |
| 2,628,435 | Minninger et al. | Feb. 17, 1953 |
| 2,725,644 | Wade et al. | Dec. 5, 1955 |

FOREIGN PATENTS

| | | |
|---|---|---|
| 825,342 | France | Dec. 8, 1937 |